Patented June 17, 1952

2,600,593

UNITED STATES PATENT OFFICE 2,600,593

COATING COMPOSITIONS

Ira Weber, Brooklyn, N. Y., assignor to Interchemical Corporation, New York, N. Y., a corporation of Ohio No Drawing. Application July 28, 1950,
Serial No. 176,553

9 Claims. (Cl. 260—22)

This invention relates to an improvement in the preparation of paints, coating compositions and printing inks. More specifically, it relates to a type of coating compositions and printing inks wherein the pigment consists of a dyestuff in solid solution in, or absorbed by, resin particles dispersed in the varnish or vehicle.

Pigments of the foregoing type have been disclosed in U. S. Patent No. 2,119,189 of May 31, 1938. According to this patent, it was found that urea-formaldehyde resins and other related condensation products of formaldehyde have a decided affinity for various dyes and that this phenomenon can be advantageously employed in pigmentizing such dyes.

The methods used in preparing these pigments comprise dissolving the dye in a solution of an unpolymerized carbamide-formaldehyde, or of a partly polymerized carbamide-formaldehyde still in the soluble phase and further reacting by means of heat with or without a catalyst. While the resin is being transformed into the insoluble phase, it absorbs or envelops the dye in the solution and precipitates, depending upon the character of the medium, in form of a colored fluffy or curd-like deposit or as a solid mass. The precipitated material is then separated, washed and dried and, if the precipitation occurred in form of a solid mass, ground into a fine powder. Another way of preparing these pigments is to first heat treat a carbamide-formaldehyde condensate in order to render it insoluble and then disperse the finely powdered resin in the dye solution. The dye is absorbed by the resin particles and yields, after separating and drying, a colored resin powder. The colored powders made according to either of the foregoing procedures are pigments suitable for paints, coating compositions, printing inks and the like.

I have now discovered that in the making of such paints, coating compositions and printing inks, it is improvident to first prepare the pigment in order to incorporate it afterwards in the vehicle. They can be made in a much more practical manner by pigmentizing them in situ. This cuts about in half the number of steps previously required in the production and in some instances results in considerable savings on dyestuff.

In the foregoing I refer to paints, coating compositions, or printing inks prepared from vehicles containing a resinous product resulting from the reaction of glycerol with phthalic anhydride or from the reaction of glycerol, phthalic anhydride and a drying, semi-drying or non-drying oil. Depending upon the use which is to be made of the finished product, be it a coating composition or an ink suitable for one of the various types of printing, the oil length of the alkyd resin can be varied in order to give a product of the required consistency. Compositions drying by evaporation can be produced, at different viscosities, by dissolving the alkyd or modified alkyd in a volatile solvent, such as alcohols, esters, ketones or aliphatic or aromatic hydrocarbons.

The method is furthermore applicable for the making of coating compositions comprising vehicles from solvent soluble carbamide-formaldehyde resins, acrylic resins, vinyl acetate-vinyl chloride copolymers, styrol resins and cellulosic compounds.

In my method of preparing coating compositions and printing inks in situ, I prefer the use of dyes which are soluble in the vehicle, although I can use dispersions of coloring material. After dissolving or dispersing the coloring matter in the vehicle, finely powdered, heat treated urea-formaldehyde resin is added. Due to the affinity of the urea-formaldehyde for soluble dyes, such dyes migrate from the vehicle into the urea-formaldehyde particles which retain them in solid solution or by absorption and thus, by definition, become pigment particles. Where coloring matter is insoluble in the vehicle and, therefore, is dispersed therein, if it is soluble in the urea-formaldehyde resin it is absorbed by the resin although the process may require more time.

By using unpolymerized or soluble, partly polymerized urea-formaldehyde resins, preferably in a solution containing, in addition to, say, an alkyd binder, higher amounts of solvent than is commonly used in vehicles of the type in question, coloring materials, which are insoluble in both the alkyd-solvent solution and the urea-formaldehyde resin can be combined with the urea-formaldehyde by adsorption. The curd-like polymerization products of the urea-formaldehyde that form upon heating occlude the coloring material and such occlusions can be held to a very small particle size by means of a fast, cutting stirrer. The temperatures which are employed as suitable for curing the urea-formaldehyde portion of these agglomerations is usually sufficient to drive off excessive solvent in order to obtain the consistency required by a varnish or printing ink. In either of the described methods urea-formaldehyde can be replaced by condensation products of formaldehyde with substituted urea compounds, such as thiourea, guanidine, biuret, guanyl urea, dicyandiamide, or their alkylation products. Or the urea-formaldehyde can be replaced by alcohol modifications of the foregoing condensation products with urea.

Generally, I prefer the use of organic dyes which are soluble in the vehicle and which, having affinity for the above resins, migrate from the vehicle to the resin particles dispersed therein. Dyes of the preferred character are the free bases of basic dyes, such as Methyl Violet, the Rhodamines, Malachite Green, Auramine, Bismark Brown and others. The basic dyes and the chemical identification thereof can be found in the "Colour Index" of the Society of Dyers and Colourists, 1st Ed., 1924. Equally useful I find some of the acetate dyes, such as 1-amino-4-hydroxy anthraquinone, 4-butyl-1,4-butylamino naphthalimide, and others.

Aside from the elimination of a number of production steps, pigmentation of such varnishes or printing inks in situ has the advantage of eliminating losses of dyestuff which occur with the prior method of preparing the pigment extraneously. According to the prior methods, it is often difficult to exhaust the dye solution, especially where pigments of high tinctorial value are required. In pigmentizing varnishes and printing inks in situ it really does not matter whether or not all of the dyestuff migrates from the continuous phase to the dispersed resin particles; any dyestuff remaining dissolved in the vehicle contributes to the final tinctorial effect. Nevertheless, a practically complete migration of the dye to the resin particles and solid solution of the dye in the resin particles is to be preferred. Fading or decomposition of dyestuffs under the influence of light is a surface effect and a dyestuff being concentrated in solid solution within resin particles offers much less surface and, therefore, is much more light-resistant than the same dyestuff molecularly distributed in the continuous phase of the vehicle. Due to the specific nature of the herein described type of pigments, films or varnishes or printing inks containing them show an unusual brilliancy because, unlike films comprising the ordinary type of pigments, they are translucent rather than opaque.

By restricting the dye strength of the foregoing compositions to concentrations approximately within the range disclosed in U. S. Patent No. 1,627,195 of May 3, 1927, in those particular instances where the dyestuff, being in solid solution in the urea-formaldehyde resin particles, in response to radiation at wavelengths which are normally absorbed, is capable of reflecting visible light close to and in addition to light normally reflected by the dye, coating compositions and printing inks can be made according to the present disclosure which, because of such additive reflectance of visible light, exhibit an extraordinary brilliancy.

The following examples are to illustrate, but not to limit the present invention. The word "parts" is to signify parts by weight.

*Example I*

150.0 parts urea (cryst.) are dissolved, by heating to not more than 50° C. and by stirring, in 1,140.0 parts of water. After complete dissolution and addition of 213.0 parts of a 37% formaldehyde solution, the temperature is raised to 65° C. and 13.4 parts of 37% hydrochloric acid are added cautiously.

The batch is heated to 70° C. and is kept at this temperature for 1½ hours. The urea-formaldehyde resin, which comes down in very fine particles, is separated hot, washed free of acid, and dried, at a temperature not exceeding 60° C.

Other, similarly useful formaldehyde condensation products or alcohol modifications of formaldehyde condensation products are prepared from thiorea, guanidine, biuret, guanyl urea, dicyandiamide and from alkylation products thereof.

*Example II*

5 parts of Methyl Violet base (Colour Index No. 655) are dispersed by the use of a three-roller mill or by means of stirring, with or without heating, in 100 parts of a 40% solution in cyclohexanone of a vinyl chloride-vinyl acetate copolymer containing 85 to 88% vinyl chloride and having an average molecular weight of 10,000.

Another similarly useful medium for dispersing or dissolving the dye is a 40% solution in toluol of ethyl methacrylate-methyl acrylate copolymer or of a 100% solids linseed oil modified alkyd resin containing 56% linseed oil.

*Example III*

1 part of the acetate dye 1-amino-4-hydroxy-anthraquinone is dispersed in 100 parts of a 60% solution in xylol of a 33% coconut oil modified alkyd resin.

*Example IV*

6 parts of the acetate dye 4-butyl-1,4-butylamino naphthalimide are dispersed in 100 parts of a 60% solution in xylol of a short oil length styrenated alkyd.

*Example V*

2 parts of Rhodamine B base (Colour Index No. 749) are dissolved in 100 parts of a 50% solution in an aromatic hydrocarbon mixture from petroleum having a boiling range from 160° to 184° C., of a 38% soya bean oil modified alkyd.

It is noteworthy that, although the dye is insoluble in the solvent, it is completely soluble in the aromatic hydrocarbon-modified alkyd solution.

*Example VI*

30 parts of the urea-formaldehyde resin prepared according to Example I are dispersed, by means of a three-roller mill, into 54 parts of the dyestuff solution of Example V.

Upon examination after thorough dispersion of the resin in the dye solution, the resultant composition consists of an intensely red colored pigment distributed in a decolorized vehicle. This composition is useful for application by means of knife coating or roller coating processes, as a paint, or as a gravure ink if diluted with additional solvent to attain the proper consistency.

Using 0.42 parts of Rhodamine B base in lieu of the 2 parts mentioned in Example V, dissolving in 100 parts of the aromatic hydrocarbon-oil modified alkyd solution described in Example V and adding urea-formaldehyde resin as specified in Example VI, produces a composition which is useful as a printing ink characterized by prints having an extraordinary brilliancy, due to fluorescence at a wavelength close to the wavelengths of the normal reflectance of the dye.

Other compositions suitable for coating, painting, or printing are prepared by dispersing in a vehicle of the type shown in Example II or III so much of a finely powdered urea-formaldehyde resin or other, related condensation products with formaldehyde, as is tolerated by the consistency requirements demanded by the use to which the final product is to be put and is necessary to substantially decolorize the vehicle. Such compositions are translucent and highly brilliant in contradistinction to the opaque and lusterless coating compositions prepared with the commonly used pigments.

*Example VII*

30 parts of the urea-formaldehyde resin of Example I are dispersed by means of a three-roller mill in up to 60 parts of the dyestuff containing vehicle prepared according to Example IV.

The product is a brilliant, translucent composition of pure green-yellow color, suitable for coating, painting, or printing.

When 0.63 part of the dyestuff mentioned in Example IV substituted for the 6 parts specified in the said example, and up to 60 parts of this more dilute solution is used in the manner disclosed in Example VI, coatings made from the resultant composition show, similar to one of the coatings made from the composition described in Example VI, an extraordinary brilliance due to an additive reflectance of light having about the same wavelength as the dominant reflectance.

I claim:

1. The process of making a pigmented coating composition which includes the steps of incorporating coloring matter in a vehicle comprising a first resin as the binder, the said vehicle being characterized by having a lesser affinity for the said coloring matter than the condensation products and alkylated condensation products of formaldehyde with a member of the group consisting of urea, thiourea, guanidine, biuret, guanyl urea and dicyandiamide, and dispersing in the said vehicle as a second resin one of the said condensation products in form of fine, insoluble particles.

2. The process according to claim 1, wherein the coloring matter is the free base of a basic dye.

3. The process according to claim 1, wherein the coloring matter is 4-butyl-1,4-butylamino naphthalimide.

4. The process according to claim 1, wherein the vehicle is a linseed oil modified alkyd resin containing 56% linseed oil.

5. The process according to claim 1, wherein the vehicle is a 40% solution in cyclohexanone of a vinyl chloride-vinyl acetate copolymer containing 85 to 88% vinyl chloride and having an average molecular weight of 10,000.

6. The process according to claim 1, wherein the vehicle is a 60% solution in xylol of a 33% coconut oil modified alkyd resin.

7. The process of pigmentizing a coating composition which includes the steps of dissolving Rhodamine B base in a vehicle comprising a 50% solution in an aromatic hydrocarbon mixture from petroleum having a boiling range from 160° to 184° C., of a 38% soya bean oil modified alkyd, dispersing heat treated urea-formaldehyde resin in form of fine particles in the vehicle and affixing the Rhodamine B base as solid solution in the urea-formaldehyde resin particles.

8. The process according to claim 7, wherein 0.23 parts of the Rhodamine B base are dissolved in 54 parts of the vehicle and 30 parts of the urea-formaldehyde resin are dispersed in the vehicle.

9. The process according to claim 1, wherein the said second resin is added in soluble form and the mass is heated while stirring.

IRA WEBER.

REFERENCES CITED

The following references are of record in the file of this patent:

UNITED STATES PATENTS

| Number | Name | Date |
|---|---|---|
| 2,119,189 | Widmer | May 31, 1938 |